US009061900B2

(12) United States Patent
Scurati et al.

(10) Patent No.: US 9,061,900 B2
(45) Date of Patent: Jun. 23, 2015

(54) COMBINED USE OF LIQUID POLYMER AND POLYMERIC NANOPARTICLES FOR RUBBER APPLICATIONS

(75) Inventors: Alberto Scurati, Milan (IT); Xiaorong Wang, Hudson, OH (US); Sandra M. Warren, Massillon, OH (US); Christopher G. Robertson, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 998 days.

(21) Appl. No.: 11/305,279

(22) Filed: Dec. 16, 2005

(65) Prior Publication Data

US 2007/0142550 A1 Jun. 21, 2007

(51) Int. Cl.
| | |
|---|---|
| *C08L 51/00* | (2006.01) |
| *B82Y 30/00* | (2011.01) |
| *B60C 1/00* | (2006.01) |
| *C08L 21/00* | (2006.01) |
| *C08L 101/00* | (2006.01) |
| *C08L 53/02* | (2006.01) |

(52) U.S. Cl.
CPC . *B82Y 30/00* (2013.01); *B60C 1/00* (2013.01); *C08K 2201/011* (2013.01); *C08L 21/00* (2013.01); *C08L 53/02* (2013.01); *C08L 101/00* (2013.01)

(58) Field of Classification Search
CPC ....... C08L 101/00; C08L 21/00; C08L 53/02; C08K 2201/011
USPC ............................ 525/70, 236, 237, 313, 314
See application file for complete search history.

(56) References Cited

U.S. PATENT DOCUMENTS

| | | | |
|---|---|---|---|
| 2,531,396 A | 11/1950 | Carter et al. | |
| 3,177,186 A | 4/1965 | Miller | |
| 3,598,884 A | 8/1971 | Wei | |
| 3,793,402 A | 2/1974 | Owens | |
| 3,840,620 A | 10/1974 | Gallagher | |
| 3,927,143 A | 12/1975 | Makowski et al. | |
| 3,972,963 A | 8/1976 | Schwab et al. | |
| 4,075,186 A * | 2/1978 | Ambrose et al. | 525/308 |
| 4,233,409 A | 11/1980 | Bulkley | |
| 4,247,434 A | 1/1981 | Vanderhoff et al. | |
| 4,248,986 A | 2/1981 | Lal et al. | |
| 4,326,008 A | 4/1982 | Rembaum | |
| 4,386,125 A | 5/1983 | Shiraki et al. | |
| 4,408,018 A | 10/1983 | Bartman et al. | |
| 4,417,029 A | 11/1983 | Milkovich | |
| 4,463,129 A | 7/1984 | Shinada et al. | |
| 4,471,093 A * | 9/1984 | Furukawa et al. | 525/237 |
| 4,543,403 A | 9/1985 | Isayama et al. | |
| 4,598,105 A | 7/1986 | Weber et al. | |
| 4,600,749 A | 7/1986 | Minekawa et al. | |
| 4,602,052 A | 7/1986 | Weber et al. | |
| 4,617,346 A | 10/1986 | Sonoda | |
| 4,659,782 A | 4/1987 | Spinelli | |
| 4,659,790 A | 4/1987 | Shimozato et al. | |
| 4,717,655 A | 1/1988 | Fulwyler | |
| 4,722,770 A | 2/1988 | Blottiere et al. | |
| 4,725,522 A | 2/1988 | Breton et al. | |
| 4,764,572 A | 8/1988 | Bean, Jr. | |
| 4,773,521 A | 9/1988 | Chen | |
| 4,774,189 A | 9/1988 | Schwartz | |
| 4,788,254 A | 11/1988 | Kawakubo et al. | |
| 4,798,691 A | 1/1989 | Kasai et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,861,131 A | 8/1989 | Bois et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |
| 5,036,138 A | 7/1991 | Stamhuis et al. | |
| 5,066,729 A | 11/1991 | Stayer, Jr. et al. | |
| 5,073,498 A | 12/1991 | Schwartz et al. | |
| 5,075,377 A | 12/1991 | Kawakubo et al. | |
| 5,120,379 A | 6/1992 | Noda et al. | |
| 5,130,377 A | 7/1992 | Trepka et al. | |
| 5,169,914 A | 12/1992 | Kaszas et al. | |

(Continued)

FOREIGN PATENT DOCUMENTS

| | | |
|---|---|---|
| CA | 2127919 | 3/1995 |
| CN | 1560094 A | 1/2005 |

(Continued)

OTHER PUBLICATIONS

Kirk-Othmer, Encyclopedia of Chemical Technology, 3rd Ed., Wiley Interscience, NY, 1982, vol. 22, "Vulcanization Agents and Auxiliary Materials," pp. 390-402.

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746, 1977.

Association of Block Copolymers in Selective Solvents, 1 Measurements on Hydrogenated Poly(styrene-isoprene) in Decane and in trans-Decalin, Mandema et al., Makromol. Chem. 180, 1521-1538, 1979.

(Continued)

*Primary Examiner* — Irina S Zemel

(74) *Attorney, Agent, or Firm* — Meredith E. Hooker; Nathan T. Lewis

(57) ABSTRACT

The present invention provides a rubber composition comprising (a) a liquid polymer, (b) polymer nanoparticles, and (c) a rubbery matrix. The composition may comprise less or even no aromatic oil. Rubber articles manufactured from such composition, such as tires and power belts, have gained improved reinforcement and controllable hysteresis properties.

12 Claims, 1 Drawing Sheet

(56) References Cited

U.S. PATENT DOCUMENTS

| | | |
|---|---|---|
| 5,183,851 A | 2/1993 | Visani et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,284,915 A | 2/1994 | Custro et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,534,592 A | 7/1996 | Halasa et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,320 B1 * | 3/2001 | Blok et al. .................. 524/534 |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,550,508 B1 * | 4/2003 | Yamaguchi et al. .......... 152/167 |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 * | 8/2004 | Lean et al. .................. 525/316 |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,695,813 B2 | 4/2010 | Schultes et al. |
| 7,718,737 B2 | 5/2010 | Wang et al. |
| 7,718,738 B2 | 5/2010 | Bohm et al. |
| 7,786,236 B2 | 8/2010 | Wang et al. |
| 7,795,344 B2 | 9/2010 | Wang et al. |
| 7,820,771 B2 | 10/2010 | Lapra et al. |
| 7,829,624 B2 | 11/2010 | Warren |
| 7,884,160 B2 | 2/2011 | Wang et al. |
| 7,897,690 B2 | 3/2011 | Wang et al. |
| 8,063,142 B2 | 11/2011 | Wang et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |

(56) References Cited

U.S. PATENT DOCUMENTS

| | | |
|---|---|---|
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0220750 A1 | 10/2005 | Robert et al. |
| 2005/0220890 A1 | 10/2005 | Charmot et al. |
| 2005/0228072 A1 | 10/2005 | Winkler et al. |
| 2005/0228074 A1 | 10/2005 | Wang et al. |
| 2005/0282956 A1 | 12/2005 | Bohm et al. |
| 2005/0288393 A1 | 12/2005 | Lean et al. |
| 2006/0084722 A1 | 4/2006 | Lin et al. |
| 2006/0116473 A1 | 6/2006 | Castner et al. |
| 2006/0147714 A1 | 7/2006 | Schultes et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2007/0027264 A1 | 2/2007 | Wang et al. |
| 2007/0081830 A1 | 4/2007 | Bender et al. |
| 2007/0135579 A1 | 6/2007 | Obrecht et al. |
| 2007/0142559 A1 | 6/2007 | Wang et al. |
| 2007/0149649 A1 | 6/2007 | Wang et al. |
| 2007/0149652 A1 | 6/2007 | Yoon et al. |
| 2007/0161754 A1 | 7/2007 | Bohm et al. |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |
| 2009/0270558 A1 | 10/2009 | Gandon-pain et al. |
| 2009/0306246 A1 | 12/2009 | Gervat et al. |
| 2010/0004398 A1 | 1/2010 | Wang et al. |
| 2010/0016472 A1 | 1/2010 | Wang et al. |
| 2010/0016512 A1 | 1/2010 | Wang et al. |
| 2010/0324167 A1 | 12/2010 | Warren et al. |
| 2011/0021702 A1 | 1/2011 | Gandon-Pain et al. |
| 2011/0024011 A1 | 2/2011 | Castner et al. |
| 2011/0213066 A1 | 9/2011 | Wang et al. |
| 2011/0236686 A1 | 9/2011 | Kitano et al. |
| 2012/0132346 A1 | 5/2012 | Chen et al. |

FOREIGN PATENT DOCUMENTS

| | | |
|---|---|---|
| DE | 3434983 | 4/1986 |
| DE | 3735403 | 5/1989 |
| DE | 4241538 | 6/1994 |
| EP | 0143500 | 6/1985 |
| EP | 0255170 | 2/1988 |
| EP | 0265142 | 4/1988 |
| EP | 0265145 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 1/2003 |
| EP | 1321489 | 6/2003 |
| EP | 1783168 | 5/2007 |
| FR | 2099645 | 3/1972 |
| JP | 70002106 B | 1/1970 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2005537341 A | 12/2005 |
| JP | 2006-072283 | 3/2006 |
| JP | 2006-106596 | 4/2006 |
| JP | 2007-304409 | 11/2007 |
| RU | 2184125 | 6/2002 |
| SU | 465010 | 3/1975 |
| WO | 91/04992 | 7/1991 |
| WO | 97/04029 | 2/1997 |
| WO | 9853000 | 11/1998 |
| WO | 0075226 | 12/2000 |
| WO | 01/87999 | 11/2001 |
| WO | 0202472 | 1/2002 |
| WO | 02/31002 | 4/2002 |
| WO | 0241987 | 5/2002 |
| WO | 0244290 A2 | 6/2002 |
| WO | 02/081233 | 10/2002 |
| WO | 02/100936 | 12/2002 |
| WO | 03/032061 | 4/2003 |
| WO | 2004/058874 | 7/2004 |
| WO | 2006/069793 | 7/2006 |
| WO | 03085040 | 10/2006 |
| WO | 2008/014464 | 1/2008 |
| WO | 2008/079276 | 7/2008 |
| WO | 2008/079807 | 7/2008 |
| WO | 2009/006434 | 1/2009 |

OTHER PUBLICATIONS

Light-Scattering Studies of a Polystyrene-Poly(methyl methacrylate) Two-Blcok Copolymer in Mixed Solvents, Utiyama et al. Macromolecules vol. 7, No. 4, Jul.-Aug., 1974.

Greenwod, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyreno-Polyisoprene . . . Layered-Silicate Nanocomposites, J. Ren, Dept. of Chem Eng. Univ. Of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.

(56) References Cited

OTHER PUBLICATIONS

R.P. Quirk and S.C. Galvan, Macromolecules, 34, 1192-1197 (2001).
M. Moller, J.P. Spaz, A. Roescher, S. Mobmer, S.T. Selvan, H.A. Klok, Macromol. Symp. 117, 207-218 (1997).
T. Cosgrove, J.S. Phipps, R.M. Richardson, Macromolecules, 26, 4363-4367 (1993).
S. Mossmer, J.P. Spatz, M.Moller, T. Aberle, J. Schmidt, W. Burchard, Macromol. 33, 4791-4798 (2000).
Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.
Super-Repellent Composite Fluoropolymer Surfaces, S.R. Coulson, 1. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.
Transformation of a Simple Plastic into a Superhydrophobic Surface, H. Yildirim Erbil et al., Science vol. 299, Feb. 28, 2003, pp. 1377-1380.
Reaction of Primary Aliphatic Amines with Maleic Anhydride, Lester E. Coleman et al., J. Org,. Chem., 24, 185, 1959, pp. 135-136.
Synthesis, Thermal Properties and Gas Permeability of Poly (N-n-alkylmaleimide)s, A. Matsumoto et al., Polymer Journal vol. 23, No. 3, 1991, pp. 201-209.
Simultaneous TA and MS Analysis of Alternating Styrene-Malei Anhydride and Styrene-Maleimide Copolymers, Thermochim. Acta, 277, 14, 1996.
Synthesis and Photocrosslinking of Maleimide-Type Polymers, Woo-Sik Kim et al., Macromol. Rapid Commun., 17, 835, 1996, pp. 835-841.
Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.
Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.
Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, Inorg. Chem. 1982, 21, pp. 1263-1264.
Polymer-m-Ionic-Liquid Electrolytes" C. Tiyapiboonchaiya, D.R. MacFarlane, J. Sun, M. Forsyth, Micromol. Chem. Phys., 2002, 203, pp. 1906-1911.
EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.
Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.
Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.
Non-Debye Relaxations in Disordered Ionic Solids, W. Dieterich, P. Maass, Chem. Chys. 2002, 284, pp. 439-467.
Polymer Layered Silicate Nanocomposites, Giannelis E.P. Advanced Materials vol. 8, No. 1, 1 Jan. 1996, pp. 29-35.
A Review of Nanocomposites 2000, J.N. Hay, S. J. Shaw.
Recent Advances in Flame Retardant Polymer Nanocomposites, Tilman, J.W. et al., pp. 273-283.
"Dendrimers and Dendrons, Concept, Synthesis, Application", edited by Newkome G.R, Wiley-VCH, 2001, pp. 45, 191-310.
"Synthesis, Functionalization and Surface Treatment of Nanoparticles", edited by Baraton M-I, ASP (Am. Sci. Pub.), Stevenson Ranch, California, 2003, pp. 51-52, 174-208.
Bahadur, Pratap, "Block copolymers—Their microdomain formation (in solid state) and surfactant behaviour (in solution)", Current Science, vol. 80, No. 8, pp. 1002-1007, Apr. 25, 2001.

Guo, Andrew et al., "Star Polymers and Nanospheres from Cross-Linkable Diblock Copolymers", Macromolecules, vol. 29, pp. 2487-2493, Jan. 17, 1996.
Ishizu, Koji et al., "Core-Shell Type Polymer Microspheres Prepared from Block Copolymers", Journal of Polymer Science: Part C: Polymer Letters, vol. 26, pp. 281-286, 1988.
Ishizu, Koji, "Synthesis and Structural Ordering of Core-Shell Polymer Microspheres", Prog. Polym. Sci., vol. 23, pp. 1383-1408, 1998.
O'Reilly, Rachel K. et al., "Cross-linked block copolymer micelles: functional nanostructures of great potential and versatility", Chem. Soc. Rev., vol. 35, pp. 1068-1083, Oct. 2, 2006.
Oranli, Levent et al., "Hydrodynamic studies on micellar solutions of styrene-butadiene block copolymers in selective solvents", Can. J. Chem., vol. 63, pp. 2691-2696, 1985.
Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.
Riess, Gerard, "Micellization of block copolymers", Prog. Polym. Sci., vol. 28, pp. 1107-1170, Jan. 16, 2003.
Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.
Thurmond, K. Bruce et al., "Shell cross-linked polymer micelles: stabilized assemblies with great versatility and potential", Colloids and Surfaces B: Biointerfaces, vol. 16, pp. 45-54, 1999.
Wilson, D.J. et al., "Photochemical Stabilization of Block Copolymer Micelles", Eur. Polym. J., vol. 24, No. 7, pp. 617-621, 1988.
Ege, Seyhan, Organic Chemistry Structure and Reactivity, 3rd Edition, p. 959, 1994.
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Ferreira, Paula G. et al., "Scaling Law for Entropic Effects at Interfaces between Grafted Layers and Polymer Melts", Macromolecules, vol. 31, pp. 3994-4003 (1998).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hasegawa, Ryuichi et al., "Optimum Graft Density for Dispersing Particles in Polymer Melts", Macromolecules, vol. 29, pp. 6656-6662 (1996).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).
Matsen, M.W., "Phase Behavior of Block Copolymer/Homopolymer Blends", Macromolecules, vol. 28, pp. 5765-5773 (1995).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Noolandi, Jaan et al., "Theory of Block Copolymer Micelles in Solution", Macromolecules, vol. 16, pp. 1443-1448 (1983).
Semenov, A.N., "Theory of Diblock-Copolymer Segregation to the Interface and Free Surface of a Homopolymer Layer", Macromolecules, vol. 25, pp. 4967-4977 (1992).

(56) References Cited

OTHER PUBLICATIONS

Semenov, A.N., "Phase Equilibria in Block Copolymer-Homopolymer Mixtures", Macromolecules, vol. 26, pp. 2273-2281 (1993).
Shull, Kenneth R., "End-Adsorbed Polymer Brushes in High- and Low-Molecular-Weight Matrices", Macromolecules, vol. 29, pp. 2659-2666 (1996).
Wang, Xiaorong et al., "Strain-induced nonlinearity of filled rubbers", Physical Review, E72, 031406, 9 pp. (Sep. 20, 2005).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Witten, T.A. et al., "Stress Relaxation in the Lamellar Copolymer Mesophase", Macromolecules, vol. 23, pp. 824-829 (1990).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).
Batzilla, Thomas et al., "Formation of intra- and intermolecular crosslinks in the radical crosslinking of poly(4-vinylstyrene)", Makromol. Chem., Rapid Commun. 8, pp. 261-268 (1987).
Bauer, B.J. et al., "Synthesis and Dilute-Solution Behavior of Model Star-Branched Polymers", Rubber Chemistry and Technology, vol. 51, pp. 406-436 (1978).
Berger, G. et al., "Mutual Termination of Anionic and Cationic 'Living' Polymers", Polymer Letters, vol. 4, pp. 183-186 (1966).
Bradley, John S., "The Chemistry of Transition Metal Colloids", Clusters and Colloids: From Theory to Applications, Chapter 6, Weinheim, VCH, pp. 459-544 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Calderara, Frederic et al., "Synthesis of chromophore-labelled polystyrene/poly(ethylene oxide) diblock copolymers", Makromol. Chem., 194, pp. 1411-1420 (1993).
Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).
Erhardt, Rainer et al., Macromolecules, vol. 34, No. 4, pp. 1069-1075 (2001).
Eschwey, Helmut et al., "Preparation and Some Properties of Star-Shaped Polymers with more than Hundred Side Chains", Die Makromolekulare Chemie 173, pp. 235-239 (1973).
Eschwey, Helmut et al., "Star polymers from styrene and divinylbenzene", Polymer, vol. 16, pp. 180-184 (Mar. 1975).
Fendler, Janos H., "Nanoparticles and Nanostructured Films: Preparation, Characterization and Applications", Wiley-VCH, pp. 1-468 (1998).
Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).
Hamley, Ian W., "The Physics of Block Copolymers", Oxford Science Publication: Oxford, Chapters 3 and 4, pp. 131-265, (1998).
Ishizu, Koji et al., "Synthesis of Star Polymer with Nucleus of Microgel", Polymer Journal, vol. 12, No. 6, pp. 399-404 (1980).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, Qinggao et al., "Entirely Hydrophilic Shell Cross-Linked Knedel-Like (SCK) Nanoparticles", Polymer Preprints, vol. 41, No. 2, pp. 1571-1572 (2000).
Mayer, A.B.R. et al., "Transition metal nanoparticles protected by amphiphilic block copolymers as tailored catalyst systems", Colloid Polym. Sci., 275, pp. 333-340 (1997).
Mi, Yongli et al., "Glass transition of nano-sized single chain globules", Polymer 43, Elsevier Science Ltd., pp. 6701-6705 (2002).
Nace, Vaughn M., "Nonionic Surfactants: Polyoxyalkylene Block Copolymers", Surfactant Science Series, vol. 60, pp. 1-266 (1996).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Piirma, Irja, "Polymeric Surfactants", Surfactant Science Series, vol. 42, pp. 1-289 (1992).
Price, Colin, "Colloidal Properties of Block Copolymers", Applied Science Publishers Ltd., Chapter 2, pp. 39-80 (1982).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Riess, Gerard et al., "Block Copolymers", Encyclopedia of Polymer Science and Engineering, vol. 2, pp. 324-434 (1985).
Saito, Reiko et al., "Synthesis of Microspheres with Microphase-Separated Shells", Journal of Polymer Science: Part A: Polymer Chemistry, vol. 38, pp. 2091-2097 (2000).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Tsitsilianis, Constantinos et al., Makromol. Chem. 191, pp. 2319-2328 (1990).
Tuzar, Zdenek et al., "Micelles of Block and Graft Copolymers in Solutions", Surface and Colloid Science, vol. 15, Chapter 1, pp. 1-83 (1993).

(56) References Cited

OTHER PUBLICATIONS

Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Synthesis, Characterization, and Application of Novel Polymeric Nanoparticles", Macromolecules, 40, pp. 499-508 (2007).
Webber, Stephen E. et al., "Solvents and Self-Organization of Polymers", NATO ASI Series, Series E: Applied Sciences, vol. 327, pp. 1-509 (1996).
Wooley, Karen L., "From Dendrimers to Knedel-like Structures", Chem. Eur. J., 3, No. 9, pp. 1397-1399 (1997).
Wooley, Karen L., "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, D.J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Kralik, M. et al., "Catalysis by metal nanoparticles supported on functional organic polymers", Journal of Molecular Catalysis A: Chemical, vol. 177, pp. 113-138 [2001].
O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].
Saito, Reiko et al., "Arm-No. effect of core-shell type polymer microsphere: 1. Control of arm-number of microsphere", Polymer, vol. 35, No. 4, pp. 866-871 (1994).
Wang, Xiaorong et al., U.S. Appl. No. 10/791,049 filed Mar. 2, 2004 entitled "Method of Making Nano-Particles of Selected Size Distribution".
Wang, Xiaorong et al., U.S. Appl. No. 10/791,177 filed Mar. 2, 2004 entitled "Rubber Composition Containing Functionalized Polymer Nanoparticles".
Wang, Xiaorong et al., U.S. Appl. No. 10/872,731 filed Jun. 21, 2004 entitled "Reversible Polymer/Metal Nano-Composites and Method for Manufacturing Same".
Wang, Xiaorong et al., U.S. Appl. No. 10/886,283 filed Jul. 6, 2004 entitled "Hydropobic Surfaces with Nanoparticles".
Wang, Xiaorong et al., U.S. Appl. No. 11/058,156 filed Feb. 15, 2005 entitled "Multi-Layer Nano-Particle Preparation and Applications".
Wang, Xiaorong et al., U.S. Appl. No. 11/104,759 filed Apr. 13, 2005 entitled "Nano-Particle Preparation and Applications".
Bohm, Georg G.A. et al., U.S. Appl. No. 11/117,981 filed Apr. 29, 2005 entitled "Self Assembly of Molecules to Form Nano-Particle".
Wang, Xiaorong et al., U.S. Appl. No. 11/344,861 filed Feb. 1, 2006 entitled "Nano-Composite and Compositions Therefrom".
Wang, Xiaorong et al., U.S. Appl. No. 11/642,796 filed Dec. 20, 2006 entitled "Hollow Nano-Particles and Method Thereof".
Wang, Xiaorong et al., U.S. Appl. No. 11/764,607 filed Jun. 18, 2007 entitled "Multi-Layer Nano-Particle Preparation and Applications".
Warren, Sandra, U.S. Appl. No. 11/771659 filed Jun. 29, 2007 entitled "One-Pot Synthesis of Nanoparticles and Liquid Polymer for Rubber Applications".
Wang, Xiaorong et al., U.S. Appl. No. 11/941,128 filed Nov. 16, 2007 entitled "Nano-Particle Preparation and Applications".
Sykes, Altrev C., Oct. 16, 2009 Office Action from U.S. Appl. No. 11/818,023 [20 pp.].
Mullis, Jeffrey C., Nov. 9, 2009 Office Action from U.S. Appl. No. 11/641,514 [9 pp.].
Mulcahy, Peter D., Nov. 9, 2009 Final Office Action from U.S. Appl. No. 11/642,802 [6 pp.].
Kiliman, Leszek B., Nov. 13, 2009 Office Action from U.S. Appl. No. 10/817,995 [6 pp.].
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
Ma, H. et al., Reverse Atom Transfer Radical Polymerization of Methyl Methacrylate in Room-Temperature Ionic Liquids, J. Polym. Sci., A Polym. Chem., 41, pp. 143-151 (2003).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
Saito, Reiko et al., "Core-Shell Type Polymer Microspheres Prepared From Poly(Styrene-b-Methacrylic Acid)—1. Synthesis of Microgel ", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).
Sakurai, Ryo et al., "68.2: Color and Flexible Electronic Paper Display using QR-LPD Technology", SID 06 Digest, pp. 1922-1925 (2006).
Simmons, Blake et al., "Templating Nanostnicture trhough the Self-Assembly of Surfactants", Synthesis, Functionalization and Surface Treatment of Nanoparticles, ASP (Am.Sci.Pub.), pp. 51-52, 174-208 (2003).
Lipman, Bernard, Mar. 26, 2002 Notice of Allowance from U.S. Appl. No. 09/970,830 (4 pp.).
Kiliman, Leszek B., Feb. 13, 2003 Office from U.S. Appl. No. 10/038,748 (3 pp.).
Kiliman, Leszak B., Aug. 25, 2003 Notice of Allowance from U.S. Appl. No. 10/038,748 (5 pp.).
Harlan, Robert D., Mar. 17, 2004 Restriction/Election Office Action from U.S. Appl. No. 10/223,393 (6 pp.).
Harlan, Robert D., Jun. 22, 2004 Office Action from U.S. Appl. No. 10/223,393 (6 pp.).
Harlan, Robert D., Jan. 3, 2005 Notice of Allowance from U.S. Appl. No. 10/223,393 (6 pp.).
Lipman, Bernard, Mar. 25, 2004 Restriction/Election Office Action from U.S. Appl. No. 10/331,841 (6 pp.).
Lipman, Bernard, Nov. 18, 2004 Notice of Allowance from U.S. Appl. No. 10/331,841 (5 pp.).
Lipman, Bernard, Mar. 24, 2004 Restriction/Election Office Action from U.S. Appl. No. 10/345,498 (5 pp.).
Lipman, Bernard, Nov. 23, 2004 Notice of Allowance from U.S. Appl. No. 10/345,498 (5 pp.).
Choi, Ling Siu, Mar. 24, 2006 Office Action from U.S. Appl. No. 10/755,648 (11 pp.).
Choi, Ling Siu, Dec. 4, 2006 Notice of Allowance from U.S. Appl. No. 10/755,648 (9 pp.).
Asinovsky, Olga, Jun. 20, 2006 Office Action from U.S. Appl. No. 10/791,049 (11 pp.).
Asinovsky, Olga, Dec. 22, 2006 Office Action from U.S. Appl. No. 10/791,049 (11 pp.).
Asinovsky, Olga, Jun. 7, 2007 Office Action from U.S. Appl. No. 10/791,049 (11 pp.).
Asinovsky, Olga, Aug. 16, 2007 Advisory Action from U.S. Appl. No. 10/791,049 (2 pp.).
Asinovsky, Olga, Nov. 28, 2007 Office Action from U.S. Appl. No. 10/791,049 (9 pp.).
Asinovsky, Olga, May 21, 2008 Office Action from U.S. Appl. No. 10/791,049 (11 pp.).
Asinovsky, Olga, Jul. 29, 2008 Advisory Action from U.S. Appl. No. 10/791,049 (3 pp.).

(56) References Cited

OTHER PUBLICATIONS

Asinovsky, Olga, Sep. 11, 2008 Office Action from U.S. Appl. No. 10/791,049 (12 pp.).
Mullis, Jeffrey C., Mar. 11, 2009 Office Action from U.S. Appl. No. 10/791,049 (9 pp.).
Ronesi, Vickey M., Jan. 8, 2007 Office Action from U.S. Appl. No. 10/791,177 (5 pp.).
Harlan, Robert D., May 3, 2007 Office Action from U.S. Appl. No. 10/791,177 (6 pp.).
Harlan, Robert D., Oct. 18, 2007 Office Action from U.S. Appl. No. 10/791,177 (6 pp.).
Harlan, Robert D., Jan. 9, 2008 Advisory Action from U.S. Appl. No. 10/791,177 (3 pp.).
Harlan, Robert D., Mar. 7, 2008 Advisory Action from U.S. Appl. No. 10/791,177 (3 pp.).
Harlan, Robert D., May 28, 2008 Office Action from U.S. Appl. No. 10/791,177 (8 pp.).
Harlan, Robert D., Dec. 10, 2008 Final Office Action from U.S. Appl. No. 10/791,177 (8 pp.).
Harlan, Robert D., Mar. 11, 2009 Notice of Allowance from U.S. Appl. No. 10/791,177 (8 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Le, Hoa T., Apr. 10, 2006 Notice of Allowance from U.S. Appl. No. 10/791,491 (5 pp.).
Mullis, Jeffrey C., May 19, 2009 Advisory Action from U.S. Appl. No. 10/791,049 (5 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszak B., May 15, 2007 Advisory Action from U.S. Appl. No. 10/817,995 (2 pp.).
Kiliman, Leszak B., Apr. 2, 2008 Notice of Allowance from U.S. Appl. No. 10/817,995 (5 pp.).
Kiliman, Leszek B., Sep. 5, 2008 Office Action from U.S. Appl. No. 10/817,995 (5 pp.).
Wyrozebski Lee, Katarzyna I., Dec. 19, 2006 Office Action from U.S. Appl. No. 10/872,731 (6 pp.).
Wyrozebski Lee, Katarzyna I., Mar. 7, 2007 Office Action from U.S. Appl. No. 10/872,731 (13 pp.).
Wyrozebski Lee, Katarzyna I., Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Mullis, Jeffrey C., Nov. 5, 2008 Advisory Action from U.S. Appl. No. 11/050,115 (4 pp.).
Lipman, Bernard., Sep. 29, 2006 Office Action from U.S. Appl. No. 11/058,156 (5 pp.).
Lipman, Bernard, May 21, 2007 Notice of Allowance from U.S. Appl. No. 11/058,156 (3 pp.).
Lipman, Bernard, Aug. 28, 2007 Notice of Allowance from U.S. Appl. No. 11/058,156 (5 pp.).
Lipman, Bernard, Feb. 28, 2008 Notice of Allowance from U.S. Appl. No. 11/058,156 (5 pp.).
Lipman, Bernard, May 29, 2008 Notice of Allowance from U.S. Appl. No. 11/058,156 (5 pp.).
Lipman, Bernard, Jan. 14, 2009 Notice of Allowance from U.S. Appl. No. 11/058,156 (5 pp.).
Lipman, Bernard, Oct. 3, 2006 Notice of Allowance from U.S. Appl. No. 11/064,234 (5 pp.).
Raza, Saira B., Oct. 20, 2005 Office Action from U.S. Appl. No. 11/104,759 (10 pp.).
Raza, Saira B., Aug. 21, 2006 Office Action from U.S. Appl. No. 11/104,759 (6 pp.).
Haider, Saira Bano, May 16, 2007 Office Action from U.S. Appl. No. 11/104,759 (9 pp.).
Haider, Saira Bano, Oct. 30, 2007 Office Action from U.S. Appl. No. 11/104,759 (9 pp.).
Haider, Saira Bano, Mar. 19, 2008 Advisory Action from U.S. Appl. No. 11/104,759 (3 pp.).
Haider, Saira Bano, Jun. 12, 2008 Office Action from U.S. Appl. No. 11/104,759 (10 pp.).
Haider, Saira Bano, Dec. 2, 2008 Office Action from U.S. Appl. No. 11/104,759 (10 pp.).
Haider, Saira Bano, Mar. 3, 2009 Advisory Action from U.S. Appl. No. 11/104,759 (3 pp.).
Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Harlan, Robert D., Jan. 9, 2009 Office Action from U.S. Appl. No. 11/117,981 (6 pp.).
Harlan, Robert D., Apr. 30, 2009 Office Action from U.S. Appl. No. 11/117,981 (7 pp.).
Lipman, Bernard, Sep. 14, 2006 Office Action from U.S. Appl. No. 11/168,297 (4 pp.).
Lipman, Bernard, Mar. 2, 2007 Notice of Allowance from U.S. Appl. No. 11/168,297 (3 pp.).
Lipman, Bernard, Apr. 18, 2007 Supplemental Notice of Allowability from U.S. Appl. No. 11/168,297 (3 pp.).
Maksymonko, John M., Jul. 17, 2008 Office Action from U.S. Appl. No. 11/305,281 (13 pp.).
Le, Hoa T., Sep. 25, 2008 Office Action from U.S. Appl. No. 11/612,554 (8 pp.).
Maksymonko, John M., Jun. 13, 2008 Office Action from U.S. Appl. No. 11/641,514 (7 pp.).
Mullis, Jeffrey C., Oct. 31, 2008 Office Action from U.S. Appl. No. 11/641,514 (10 pp.).
Mullis, Jeffrey C., Apr. 30, 2009 Final Office Action from U.S. Appl. No. 11/641,514 (11 pp.).
Mullis, Jeffrey C., Jul. 15, 2009 Advisory Action from U.S. Appl. No. 11/641,514 (4 pp.).
Maksymonko, John M., Jun. 11, 2008 Office Action from U.S. Appl. No. 11/642,124 (16 pp.).
Cain, Edward J., Dec. 31, 2008 Notice of Allowance from U.S. Appl. No. 11/642,124 (5 pp.).
Maksymonko, John M., May 30, 2008 Office Action from U.S. Appl. No. 11/642,795 (12 pp.).
Cain, Edward J., Dec. 9, 2008 Final Office Action from U.S. Appl. No. 11/642,795 (6 pp.).
Maksymonko, John M., May 28, 2008 Office Action from U.S. Appl. No. 11/642,802 (10 pp.).
Mulcahy, Peter D., Dec. 11, 2008 Restriction/Election Office Action from U.S. Appl. No. 11/642,802 (7 pp.).
Mulcahy, Peter D., May 13, 2009 Office Action from U.S. Appl. No. 11/642,802 (7 pp.).

(56) References Cited

OTHER PUBLICATIONS

Peets, Monique R., May 11, 2009 Restriction/Election Office Action from U.S. Appl. No. 11/697,801 (6 pp.).
Peets, Monique R., Jul. 20, 2009 Office Action from U.S. Appl. No. 11/697,801 (9 pp.).
Lipman, Bernard, Mar. 20, 2008 Office Action from U.S. Appl. No. 11/764,607 (4 pp.).
Lipman, Bernard, Sep. 25, 2008 Notice of Allowance from U.S. Appl. No. 11/764,607 (3 pp.).
Lipman, Bernard, Jan. 27, 2009 Notice of Allowance from U.S. Appl. No. 11/764,607 (4 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Chen, Jizhuang, Dec. 30, 2005 Office Action from Chinese Patent Application No. 02819527.2 (9 pp.).
Chen, Jizhuang, Dec. 21, 2007 Office Action from Chinese Patent Application No. 02819527.2 (12 pp.).
Chen, Jizhuang, Sep. 26, 2008 Office Action from Chinese Patent Application No. 02819527.2 (4 pp.).
Schutte, M., Aug. 8, 2006 Office Action from European Patent Application No. 02807196.7 (5 pp.).
Schutte, Maya, Sep. 3, 2007 Office Action from European Patent Application No. 02807196.7 (2 pp.).
Russell, Graham, Nov. 4, 2008 Office Action from European Patent Application No. 05742316.2 (2 pp.).
Watanabe, Y., May 7, 2008 Office Action from Japanese Patent Application No. 582224/2003 (5 pp.).
Watanabe, Y., Jul. 29, 2008 Office Action from Japanese Patent Application No. 582224/2003 (17 pp.).
Schutte, M., Nov. 13, 2003 International Search Report from PCT Patent Application No. PCT/US02/31817 (3 pp.).
Schutte, M., May 28, 2004 International Search Report from PCT Patent Application No. PCT/US03/40375 (3 pp.).
Iraegui Retolaza, E., Jul. 9, 2004 International Search Report from PCT Patent Application No. PCT/US2004/001000 (3 pp.).
Russell, G., Aug. 1, 2005 International Search Report from PCT Patent Application No. PCT/US2005/010352 (3 pp.).
Iraegui Retolaza, E., May 30, 2008 International Search Report from PCT Patent Application No. PCT/US2007/026031 (4 pp.).
Johnson, Edward M., Dec. 12, 2008 International Search Report from PCT Application No. PCT/US07/74611 (5 pp.).
Mettler, Rolf-Martin, May 27, 2008 International Search Report from PCT Patent Application No. PCT/US2007/087869 (4 pp.).
Hammon, Andrew, Aug. 25, 2008 International Search Report from PCT Patent Application No. PCT/US2008/068838 (4 pp.).
Wang, Xiaorong et al., U.S. Appl. No. 12/374883 international filing date Jul. 27, 2007, entitled "Polymeric Core-Shell Nanoparticles with Interphase Region".
Haider, Saira Bano, Sep. 11, 2009 Examiner's Answer from U.S. Appl. No. 11/104,759 (9 pp.).
Harlan, Robert D., Sep. 29, 2009 Final Office Action from U.S. Appl. No. 11/117,981 (6 pp.).
Chevalier, Alicia Ann, Nov. 25, 2009 Office Action from U.S. Appl. No. 10/886,283 [7 pp.].
Harlan, Robert D., Dec. 4, 2009 Notice of Allowance from U.S. Appl. No. 11/117,981 [5 pp.].
Mullis, Jeffrey C., Dec. 18, 2009 Supplemental Notice of Allowability from U.S. Appl. No. 11/050,115 [2 pp.].
Harlan, Robert D., Dec. 29, 2009 Notice of Allowance from U.S. Appl. No. 10/791,177 [6 pp.].
Peets, Monique R., Jan. 5, 2010 Final Office Action from U.S. Appl. No. 11/697,801 [9 pp.].
Pak, Hannah J., Jan. 6, 2010 Final Office Action from U.S. Appl. No. 11/941,128 [10 pp.].
Harlan, Robert D., Dec. 28, 2009 Office Action from U.S. Appl. No. 12/504,255 [6 pp.].
Wheeler, Thurman Michael, Feb. 8, 2010 Office Action from U.S. Appl. No. 11/642,796 [13 pp.].

Berger, Sebastian et al., "Stimuli-Responsive Bicomponent Polymer Janus Particles by 'Grafting from'/ 'Grafting to' Approaches," Macromolecules, 41, pp. 9669-9676 (2008).
Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).
Dendukuri, Dhananjay et al., "Synthesis and Self-Assembly of Amphiphilic Polymeric Microparticles," Langmuir, 23, pp. 4669-4674 (2007).
The Dow Chemical Company, "DVB Cross-link a variety of materials for improved thermal, physical, and chemical properties," 44 pp. (Jan. 2003).
Robertson, C.G. et al., "Effect of structural arrest on Poisson's ratio in nanoreinforced elastomers," Physical Review E, vol. 75, pp. 051403-1 thru 051403-7 (2007).
Schacher, Felix et al., "Multicompartment Core Micelles of Triblock Terpolymers in Organic Media," Macromolecules, 42, pp. 3540-3548 (2009).
Tsitsilianis, Constantinos, "Phase Behavior of Heteroarm Star Copolymers by Differential Scanning Calorimetry," Macromolecules, 26, pp. 2977-2980 (1993).
Walther, Andreas et al., "Engineering Nanostructured Polymer Blends with Controlled Nanoparticle Location using Janus Particles," ACS Nano., 2(6), pp. 1167-1178 (2008).
Walther, Andreas et al., "Janus Particles," Soft Matter, 4, pp. 663-668 (2008).
Wang, Y. et al., "Janus-Like Polymer Particles Prepared Via Internal Phase Separation from Emulsified Polymer/Oil Droplets," Polymer, vol. 50, No. 14, pp. 3361-3369 (2009).
Zhang, Jian et al., "Bioconjugated Janus Particles Prepared by in Situ Click Chemistry," Chemistry of Materials, 21, pp. 4012-4018 (2009).
Zhao, Bin et al., "Mixed Polymer Brush-Grafted Particles: A New Class of Environmentally Responsive Nanostructured Materials," Macromolecules, 42, pp. 9369-9383 (2009).
Mullis, Jeffrey C., May 26, 2010 Final Office Action from U.S. Appl. No. 11/641,514 (8 pp.).
Ducheneaux, Frank D., Jun. 8, 2010 Office Action from U.S. Appl. No. 10/817,995 (19 pp.).
Harlan, Robert D., Jun. 9, 2010 Office Action from U.S. Appl. No. 12/504,255 (6 pp.).
Chevalier, Alicia Ann, Jul. 8, 2010 Advisory Action from U.S. Appl. No. 10/886,283 (3 pp.).
Wheeler, Thurman Michael, Jul. 30, 2010 Final Office Action from U.S. Appl. No. 11/642,796 (15 pp.).
Mullis, Jeffrey C., Aug. 12, 2010 Advisory Action from U.S. Appl. No. 11/641,514 (4 pp.).
Mensah, Laure, Sep. 20, 2010 Office Action from European Patent Application No. 07813483.0 (4 pp.).
Egwim, Kelechi Chidi, Sep. 30, 2010 Office Action from U.S. Appl. No. 12/047,896 (6 pp.).
Mullis, Jeffrey C., Oct. 8, 2010 Notice of Allowance from U.S. Appl. No. 11/641,514 (2 pp.).
Sykes, Altrev C., Oct. 29, 2010 Examiner's Answer from U.S. Appl. No. 11/818,023 (24 pp.).
Chevalier, Alicia Ann, Nov. 23, 2010 Office Action from U.S. Appl. No. 10/886,283 (6 pp.).
Harlan, Robert D., Dec. 1, 2010 Notice of Allowance from U.S. Appl. No. 12/504,255 (6 pp.).
Ducheneaux, Frank D., Dec. 28, 2010 Final Office Action from U.S. Appl. No. 10/817,995 (24 pp.).
Haider, Saira Bano, Feb. 9, 2011 Decision on Appeal from U.S. Appl. No. 11/104,759 (4 pp.).
Mullis, Jeffrey C., Feb. 9, 2011 Restriction/Election Office Action from U.S. Appl. No. 12/288,174 (8 pp.).
Egwim, Kelechi Chidi, Mar. 21, 2011 Final Office Action from U.S. Appl. No. 12/047,896 (6 pp.).
Mullis, Jeffrey C., Mar. 30, 2011 Decision on Appeal from U.S. Appl. No. 10/791,049 (7 pp.).
Ducheneaux, Frank D., Apr. 4, 2011 Advisory Action from U.S. Appl. No. 10/817,995 (6 pp.).
Rosenberg, Nancy D., Apr. 12, 2011 Notice of Allowance from U.S. Appl. No. 10/886,283 (4 pp.).

(56) References Cited

OTHER PUBLICATIONS

Brovkina, T.A., English translation of May 4, 2011 Office Action from Russian Patent Application No. 2009107218 (7 pp.).
Mullis, Jeffrey C., May 23, 2011 Office Action from U.S. Appl. No. 12/288,174 (6 pp.).
Wheeler, Thurman Michael, May 31, 2011 Office Action from U.S. Appl. No. 11/642,796 (12 pp.).
Mullis, Jeffrey C., Jun. 3, 2011 Restriction/Election Office Action from U.S. Appl. No. 12/374,883 (7 pp.).
Egwim, Kelechi Chidi, Jun. 13, 2011 Advisory Action from U.S. Appl. No. 12/047,896 (2 pp.).
Xia, Lanying, Jul. 6, 2011 Office Action with English translation from Chinese Patent Application No. 200780047895.2 (8 pp.).
Mullis, Jeffrey C., Jul. 27, 2011 Office Action from U.S. Appl. No. 12/374,883 (13 pp.).
Brovkina, T.A., Oct. 12, 2011 Office Action from Russian Patent Application No. 2009107218 with English translation (8 pp.).
Nov. 3, 2011 Office Action with English translation from Chinese Patent Application No. 200780036040.X (12 pp.).
Mulcahy, Peter D., Nov. 9, 2011 Office Action from U.S. Appl. No. 11/642,802 (6 pp.).
Mullis, Jeffrey C., Nov. 14, 2011 Office Action from U.S. Appl. No. 12/666,146 (6 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Boletti, Cesare, Apr. 18, 2012 Office Action from European Patent Application No. 08772275.7 (3 pp.).
Wang, Chun Cheng, May 4, 2012 Office Action from U.S. Appl. No. 12/555,183 (9 pp.).
Hofler, Thomas, May 22, 2012 Supplementary European Search Report with Search Opinion from European Patent Application No. 09837105.7 (5 pp.).
Watanabe, Yoko, May 22, 2012 Office Action with English translation from Japanese Patent Application No. 2008-248866 (5 pp.).
Malashkova, E.S., Jun. 1, 2012 Office Action with English translation from Russian Patent Application No. 2010102943 (10 pp.).
Fink, Brieann R., Jun. 6, 2012 Final Office Action from U.S. Appl. No. 12/754,367 (13 pp.).
Adams, Donald E. et al., Jun. 18, 2012 Decision on Appeal from U.S. Appl. No. 11/818,023 (13 pp.).
Mullis, Jeffrey C., Jul. 24, 2012 Final Office Action from U.S. Appl. No. 12/666,146 (8 pp.).
Jul. 30, 2012 Second Office Action with English translation from Chinese Patent Application No. 200880102778.6 (20 pp.).
Kaucher, Mark S., Nov. 5, 2012 Office Action from U.S. Appl. No. 12/979,732 (24 pp.).
Wheeler, Thurman Michael, Nov. 6, 2012 Office Action from U.S. Appl. No. 11/642,796 (14 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (7 pp.).
Kaucher, Mark S., Dec. 18, 2012 Office Action from U.S. Appl. No. 13/142,770 (19 pp.).
"KIPO'S Notice of Preliminary Rejection for Korean Patent Application No. 10-2010-7001987", Issue Date: Jan. 14, 2015, 5 pages.

* cited by examiner

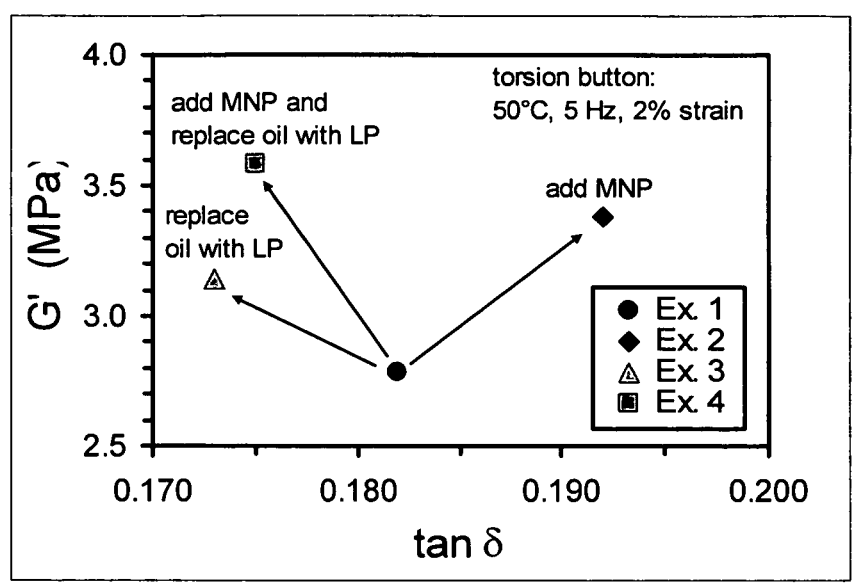

COMBINED USE OF LIQUID POLYMER AND POLYMERIC NANOPARTICLES FOR RUBBER APPLICATIONS

BACKGROUND OF THE INVENTION

The present invention is generally related to a rubber composition. More particularly, the present invention is related to a composition comprising a liquid polymer and polymer nanoparticles, which is used to manufacture rubber articles with improved reinforcement and controllable hysteresis.

For rubber articles such as a vehicle tire, important properties such as tread wear/durability, wet/dry traction and rolling resistance can be somewhat determined by the composition of the tread compound. Snow and ice traction (G' at −20° C.), wet traction (tan δ at 0° C.), and rolling resistance (tan δ at 50° C.) are commonly used in the tire industry to predict tire performance.

Achieving good reinforcement while desirably controlling hysteresis properties is very challenging and demanding. For example, although high levels of aromatic processing oils are normally included in tire tread formulations to increase dry traction characteristics (see U.S. Pat. No. 4,861,131), the aromatic oils can reduce the durability of the tire.

The present invention provides a rubber composition comprising a liquid polymer and polymer nanoparticles. In preferred embodiments, the composition may include less or even no aromatic oil. The composition is extremely useful in manufacturing rubber articles such as tires and power belts with improved properties.

BRIEF DESCRIPTION OF THE INVENTION

One embodiment of the invention provides a composition comprising (a) a liquid polymer, (b) polymer nanoparticles, and (c) a rubber matrix.

Another embodiment provides a composition comprising (a) a liquid polymer, (b) polymer nanoparticles, (c) a rubber matrix, (d) an optional oil, and (e) one or more components selected from the group consisting of carbon black, silica, vulcanizing agent, vulcanization accelerator, tackifier resin, antioxidant, fatty acids, zinc oxide, wax, peptizer, vulcanization retarder, activator, processing additive, plasticizer, pigments, and antiozonant.

Still another embodiment provides rubber articles manufactured from a composition comprising (a) a liquid polymer, (b) polymer nanoparticles, (c) a rubbery matrix, (d) an optional oil, and (e) one or more components selected from the group consisting of carbon black, silica, vulcanizing agent, vulcanization accelerator, tackifier resin, antioxidant, fatty acids, zinc oxide, wax, peptizer, vulcanization retarder, activator, processing additive, plasticizer, pigments, and antiozonant.

BRIEF DESCRIPTION OF THE DRAWINGS

The drawings are only for purposes of illustrating preferred embodiments and are not to be construed as limiting the invention. In the drawings appended hereto:

FIG. 1 shows a rubber article with improved reinforcement and controllable hysteresis in an embodiment of the present invention.

DETAILED DESCRIPTION OF ILLUSTRATIVE EMBODIMENTS

It is to be understood herein, that if a "range" or "group" is mentioned with respect to a particular characteristic of the present invention, for example, molecular weight, ratio, percentage, chemical group, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

As will be used in this description, the term "phr" refers to "parts by weight of a respective material per 100 parts by weight of the rubber matrix".

The average molecular weight (Mn, Mw or Mp) of the liquid polymer may be controlled within the range of from about 10K to about 120K, within the range of from about 20K to about 110K, or within the range of from about 25K to about 100K. The weight average molecular weight of the liquid polymer can range from about 70K to 90K.

The glass transition temperature (Tg) of the liquid polymer may be within the range of from about −90° C. to about −20° C., or within the range of from about −90° C. to about 0° C., or within the range of from about −90° C. to about −40° C., or within the range of from about −90° C. to about −50° C. The liquid polymer may exhibit only one glass transition temperature.

The liquid polymer can comprise a homopolymer of conjugated diene monomers or a copolymer of conjugated diene monomers with, for example, vinyl aromatic monomers and/or trienes such as myrcene, among others. As used herein, liquid polymers of conjugated diene monomers include not only polymer of same conjugated diene monomers such as a liquid poly(butadiene), but also include polymer of two or more different conjugated diene monomers such as a liquid isoprene-butadiene rubber.

The conjugated diene monomer may be selected from one or more of conjugated 1,3-diene monomers represented by the formula (I) as shown below:

in which $R_1$, $R_2$, $R_3$, and $R_4$ are each independently selected from the group consisting of hydrogen, methyl, ethyl, propyl, and isopropyl. $C_4$-$C_8$ conjugated diene monomers of formula (I) are the most preferred.

Specific examples of the conjugated diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the conjugated diene monomer(s).

When a copolymer of conjugated diene monomer(s) is used as the liquid polymer, the comonomer may be vinyl aromatic monomer selected from the group consisting of styrene, ethylvinylbenzene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 20; and mixtures thereof. In exemplary embodiments, the conjugated diene monomer and vinyl aromatic monomer are normally used at the weight ratios of about 99:1 to about 1:99, or about 20:80 to about 80:20.

The liquid polymer may comprise polyisoprene, polybutadiene, styrene-butadiene copolymer, styrene-isoprene-butadiene copolymer, styrene-isoprene copolymer, butadiene-isoprene copolymer, liquid butyl rubber, liquid neoprene, ethylene-propylene copolymer, ethylene-propylene-diene copolymer, acrylonitrile-butadiene copolymer, liquid silicone, ethylene acrylic copolymer, ethylene vinyl acetate copolymer, liquid epichlorohydrin, liquid chlorinated polyethylene, liquid chlorosulfonated polyethylene rubbers, liquid hydrogenated nitrile rubber, liquid tetrafluoroethylene-propylene rubber, liquid hydrogenated polybutadiene and styrene-butadiene copolymer, and the like, and the mixture thereof.

In an example, a poly(butadiene) with a Mw of 80K was used as the liquid polymer. In another example, the liquid polymer comprises a liquid isoprene-butadiene rubber (IBR), which is comprised of repeat units which are derived from about 5 weight percent to about 95 weight percent isoprene and from about 5 weight percent to about 95 weight percent 1,3-butadiene, wherein the repeat units derived from isoprene and 1,3-butadiene are in essentially random order.

In a variety of exemplary embodiments, the liquid polymer of the invention may be commercially obtained or prepared by any known methods such as solution polymerization or emulsion polymerization via anionic, free radical, coordination or cationic mechanism, among others. For example, a liquid poly(butadiene) with a Mw of 80K may be prepared from anionic polymerization of butadiene in a liquid hydrocarbon medium such as hexane with a lithium initiator such as n-butyl lithium at about 100° F. to about 200° F. for about 0.5 hour to about 2 hours.

When liquid poly(1,3-butadiene-co-isoprene) is prepared, since the copolymerization of the two monomers is normally carried out to a high conversion, the ratio of repeat units in the liquid polymer will be about the same as was employed in the monomer charge composition. Although liquid poly(1,3-butadiene-co-isoprene) can be made by a batch process or continuously, it will normally be advantageous to synthesize the liquid poly(1,3-butadiene-co-isoprene) on a continuous basis. In such a continuous process, the monomers and an organolithium initiator are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 20° C. to about 140° C. throughout the copolymerization. The liquid poly(1,3-butadiene-co-isoprene) produced by the copolymerization is recovered from organic solvent after the desired monomer conversion has been attained. The liquid poly(1,3-butadiene-co-isoprene) can be recovered from an organic solvent by standard techniques, such as precipitation of poly(1,3-butadiene-co-isoprene) from the organic solvent by the addition of lower alcohols containing from 1 to about 4 carbon atoms to the polymer solution. Suitable lower alcohols for precipitation of the isoprene-butadiene rubber from the polymer cement include methanol, ethanol, isopropyl alcohol, n-propyl alcohol and t-butyl alcohol. The utilization of lower alcohols to precipitate the liquid isoprene-butadiene rubber from the polymer cement also "kills" the living polymer chains by inactivating lithium end groups. After the poly(1,3-butadiene-co-isoprene) is recovered from the organic solvent, steam-stripping can be employed to reduce the level of volatile organic compounds in the polymer.

Typical amount of the liquid polymer (LP) in the composition may broadly range from about 1 phr to about 99 phr, from about 5 phr to about 75 phr, or from about 10 phr to about 65 phr, based on 100 phr rubbery matrix in the composition of the invention.

The polymer nanoparticles used for the invention include a vulcanizable shell and a crosslinked core. The vulcanizable shell may be a sulfur or peroxide curable shell. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. Prior patents and publications such as U.S. Pat. No. 6,437,050 (Bridgestone Corp.) and Macromol. Symp. 118, 143-148 (1997) are incorporated herein as general references.

The polymer nanoparticles may be functionalized. The methods for such functionalization may include functionalization by a specifically designed initiator; functionalization by a specifically designed terminating agent; functionalization by copolymerization of a functionalized comonomer when generating the shell and/or the core; or functionalization by modification of any unsaturated groups such as vinyl groups in the poly(conjugated diene) shell. Exemplary functional groups that may be incorporated into the polymer nanoparticles include, but are not limited to, maleimide, hydroxyl, carboxy, formyl, azocarboxy, epoxide, amino, organo tin, aluminum, and the like, and the mixture thereof.

In a variety of exemplary embodiments, the shell may be produced from any suitable conjugated diene or mixture thereof. For example, the conjugated diene may be selected from conjugated 1,3-diene monomer represented by the formula (II) as shown below:

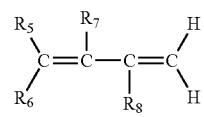

(II)

in which $R_5$, $R_6$, $R_7$, and $R_8$ are each independently selected from the group consisting of hydrogen, methyl, ethyl, propyl, and isopropyl. $C_4$-$C_8$ conjugated diene monomers of formula (II) are the most preferred.

In a variety of exemplary embodiments, specific examples of the shell monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the shell monomer.

The crosslinked core of the nanoparticles is typically produced from copolymerization of mono-vinyl aromatic monomers and multiple-vinyl aromatic monomers. The weight ratio between the mono-vinyl aromatic monomers and multiple-vinyl aromatic monomers may broadly range from about 95:5 to about 0:100, from about 90:10 to about 25:75, or from about 85:15 to about 60:40.

Any compound that comprises one vinyl group and an aromatic group may be used as the mono-vinyl aromatic monomer. Suitable mono-vinyl aromatic monomers include, but are not limited to styrene, ethylvinylbenzene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof. In exemplified embodiments, the mono-vinyl aromatic monomer comprises styrene.

Any compound that comprises two or more vinyl groups and an aromatic group may be used as the multiple-vinyl aromatic monomer. Suitable multiple-vinyl aromatic monomers include, but are not limited to compounds with a general formula as shown below:

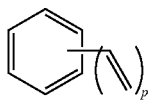

in which p is an integer and 2≤p≤6, preferably, p is 2 or 3, more preferably p is 2, i.e. di-vinyl-benzene (DVB).

The DVB may be selected from any one of the following isomers or any combination thereof:

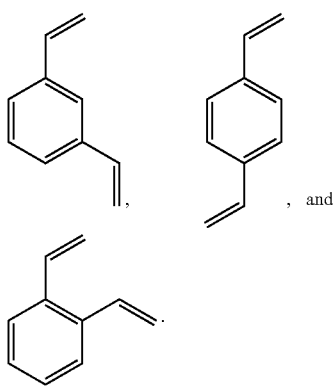

The polymer nanoparticle may take the shape of nanospheres. The mean diameter of the spheres may be broadly within the range of from about 1 nm to about 200 nm, within the range of from about 5 nm to about 100 nm, within the range of from about 10 nm to about 80 nm, or within the range of from about 15 nm to about 70 nm.

The average molecular weight (Mn, Mw or Mp) of the poly(conjugated diene) bloc, 000 may be controlled within the range of from about 5,000 to about 500,000, or within the range of from about 5,000 to about 200,000, and most preferably within the range of from about 10,000 to about 100,000. The average molecular weight (Mn, Mw or Mp) of the aromatic bloc,000 may be controlled within the range of from about 5,000 to about 500,000, within the range of from about 5,000 to about 200,000, or within the range of from about 10,000 to about 100,000.

The average molecular weight (Mn, Mw or Mp) of the entire polymer nano-particle may be controlled within the range of from about 10,000 to about 10,000,000, within the range of from about 50,000 to about 1,000,000, or within the range of from about 100,000 to about 500,000. The polydispersity (the ratio of the weight average molecular weight to the number average molecular weight) of the polymer nanoparticle may be controlled within the range of from about 1 to about 1.5, within the range of from about 1 to about 1.3, or within the range of from about 1 to about 1.2.

The polymer nano-particles of the invention may be prepared by at least two methods. The first method comprises:

(i) in a liquid hydrocarbon medium, polymerizing conjugated diene monomers to produce a poly(conjugated diene) block;

(ii) copolymerizing the poly(conjugated diene) block with mono-vinyl aromatic monomer; and (iii) crosslinking the step (ii) intermediate with multiple-vinyl aromatic monomers. The portions of the polymerized mono-vinyl aromatic monomer and the polymerized multiple-vinyl aromatic monomer may be collectively called aromatic block. In this method, while step (ii) takes place, a sufficient amount of the copolymers comprising the poly(conjugated diene) block and the mono-vinyl aromatic block may assemble to form micelle structures; and subsequently when step (iii) takes place, the aromatic blocks may be crosslinked with the multiple-vinyl aromatic monomers.

The second method comprises:

(i) in a liquid hydrocarbon medium, polymerizing conjugated diene monomers to produce a poly(conjugated diene) block; and (ii) copolymerizing the poly(conjugated diene) block with a mixture of mono-vinyl aromatic monomers and multiple-vinyl aromatic monomers to produce an aromatic block.

In the second method, while step (ii) takes place, a sufficient amount of the copolymers comprising the poly(conjugated diene) block and the aromatic block may assemble to form micelle structures, and typically in the meanwhile, the aromatic blocks may be crosslinked by the multiple-vinyl aromatic monomers.

The products from the first method and the second method are typically not the same. Under similar conditions, the first method gives polymer nanoparticles with a core densely crosslinked only in the central region of the core; while the second method gives polymer nanoparticles with a core relatively less densely crosslinked, but entirely crosslinked throughout the entire region of the core.

In a variety of exemplary embodiments, the polymer nanoparticles are formed through dispersion polymerization, although emulsion polymerization may also be contemplated. In preferred exemplary embodiments, the method of the invention comprises a multi-stage anionic polymerization. Multi-stage anionic polymerizations have been conducted to prepare block-copolymers, for example in U.S. Pat. No. 4,386,125, which is incorporated herein by reference. Other relevant references include U.S. Pat. No. 6,437,050 and U.S. Patent Application 2004/0143064.

The polymer nanoparticles of the invention are formed from di-block copolymer chains comprising the poly(conjugated diene) block and the aromatic block. The aromatic blocks are typically crosslinked due to the presence of multiple-vinyl aromatic monomers. The polymer nanoparticles preferably retain their discrete nature with little or no polymerization between each other. In preferred embodiments, the nanoparticles are substantially monodisperse and uniform in shape.

The liquid hydrocarbon medium functions as the dispersion solvent, and may be selected from any suitable aliphatic hydrocarbons, alicyclic hydrocarbons, or mixture thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclopentane, cycloheptane, cyclooctane, cyclononane, cyclodecane, and the like. Generally, aromatic hydrocarbons and polar solvents are not preferred as the liquid medium. In one embodiment, the liquid hydrocarbon medium comprises hexane.

In a variety of exemplary embodiments, the polymerization of conjugated diene monomers into a poly(conjugated diene) block is initiated via addition of anionic initiators that are known in the art. For example, the anionic initiator can be selected from any known organolithium compounds. Suitable organolithium compounds are represented by the formula as shown below:

$$R(Li)_x$$

wherein R is a hydrocarbyl group having 1 to x valence(s). R generally contains 1 to 20, preferably 2-8, carbon atoms per R group, and x is an integer of 1-4. Typically, x is 1, and the R group includes aliphatic radicals and cycloaliphatic radicals, such as alkyl, cycloalkyl, cycloalkylalkyl, alkylcycloalkyl, alkenyl, as well as aryl and alkylaryl radicals.

Specific examples of R groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Other lithium initiators include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like. Preferred lithium initiators include n-butyllithium, sec-butyllithium, tert-butyllithium, 1,4-dilithiobutane, and mixtures thereof.

Other lithium initiators which can be employed are lithium dialkyl amines, lithium dialkyl phosphines, lithium alkyl aryl phosphines and lithium diaryl phosphines. Functionalized lithium initiators are also contemplated as useful in the present invention. Preferred functional groups include amines, formyl, carboxylic acids, alcohol, tin, silicon, silyl ether and mixtures thereof.

In preferred embodiments, n-butyllithium, sec-butyllithium, tert-butyllithium, or mixture thereof are used to initiate the polymerization of the conjugated diene monomers into a poly(conjugated diene) block.

The polymerizing of conjugated diene monomers into a poly(conjugated diene) block may last as long as necessary until the desired monomer conversion, degree of polymerization (DP), and block molecular weight are obtained. The polymerization reaction of this step nay last typically from about 0.1 hours to about 10 hours, preferably from about 0.5 hours to about 5 hours, more preferably from about 1 hours to about 2 hours. The polymerization reaction of this step may be conducted at a temperature of from about 30° F. to about 250° F., preferably form about 80° F. to about 200° F., and more preferably form about 100° F. to about 180° F.

The anionic polymerization of the invention may be conducted in the presence of a modifier or a 1,2-microstructure controlling agent, so as to, for example, increase the reaction rate, equalize the reactivity ratio of monomers, and/or control the 1,2-microstructure in the conjugated diene monomers. Suitable modifiers include, but are not limited to, triethylamine, tri-n-butylamine, hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethylamine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like.

In certain embodiments, the anionic polymerization is conducted in the presence of an amine compound such as triethyl amine, trimethyl amine, tripropyl amine, tri-isopropyl amine, tri-n-butyl amine, and the like, and the mixture thereof.

Other modifiers or 1,2-microstructure controlling agents used in the present invention may be linear oxolanyl oligomers represented by the structural formula (IV) and cyclic oligomers represented by the structural formula (V), as shown below:

Formula (IV)

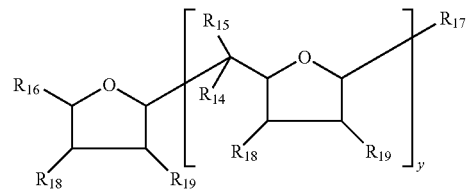

Formula (V)

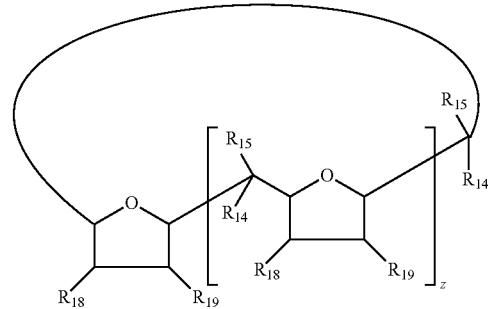

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers or 1,2-microstructure controlling agents include, but are not limited to, oligomeric oxolanyl propanes (OOPs); 2,2-bis-(4-methyl dioxane); bis (2-oxolanyl)methane; 1,1-bis(2-oxolanyl)ethane; bistetrahydrofuryl propane; 2,2-bis(2-oxolanyl)propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene(cyclic tetramer);

2,2-bis(2-oxolanyl)butane; and the like. A mixture of two or more modifiers or 1,2-microstructure controlling agents also can be used.

Additional anionic initiator such as lithium initiator may be optionally added when the mono-vinyl aromatic monomers and the multiple-vinyl aromatic monomers are, simultaneously or sequentially, copolymerized with the living poly(conjugated diene) block. Exemplary anionic initiators may be those described above. In preferred embodiments, n-butyllithium, sec-butyllithium, tert-butyllithium, or mixture thereof are used. The polymerization may last as long as necessary until the monomer conversion, degree of polymerization (DP), and block molecular weight are obtained. The polymerization reaction of this step may last typically from about 0.5 hours to about 20 hours, preferably from about 0.5 hours to about 10 hours, more preferably from about 0.5 hours to about 5 hours. The polymerization reaction of this step may be conducted at a temperature of from about 30° F. to about 300° F., preferably form about 100° F. to about 250° F., and more preferably form about 150° F. to about 210° F.

Without being bound to any particular theory, it is believed that the poly(conjugated diene) block is more soluble or miscible in a selected liquid hydrocarbon medium than the aromatic block, which facilitates the subsequent micelle-like assembling and nanoparticle formation from the block copolymer chains.

Depending on their miscibility, polymer chains in solution or suspension system can be self-assembled into domains of various structures. Without being bound to any theory, it is believed that a micelle-like structure may be formed by aggregating the block copolymer chains comprising the poly(conjugated diene) block and the aromatic block. The aromatic blocks are typically directed toward the central region of the micelle and the poly(conjugated diene) blocks are typically extended away from the center.

Without being bound to any theory, it is believed that the multiple-vinyl aromatic monomers are able to migrate to the center of the micelle-like structures, and crosslink the center core of the micelle to form the polymer nanoparticles.

The polymer nanoparticles of the invention are formed from the micelle-like structures with a core made from the aromatic blocks, and a shell made from the poly(conjugated diene) blocks.

The polymerization reactions used to prepare the polymer nanoparticles may be terminated with a terminating agent. Suitable terminating agents include, but are not limited to, alcohols such as methanol, ethanol, propanol, and isopropanol. In exemplified embodiments, the polymerization reaction mixture was cooled down and dropped in an isopropanol/acetone solution optionally containing an antioxidant such as butylated hydroxytoluene (BHT). The isopropanol/acetone solution may be prepared, for example, by mixing 1 part by volume of isopropanol and 4 parts by volume of acetone.

Typical amounts of the polymer nanoparticles in the composition may broadly range from about 1 phr to about 200 phr, from about 1 phr to about 100 phr, or from about 1 phr to about 50 phr, based on 100 phr rubbery matrix in the composition of the invention.

The rubbery matrix of the invention may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to about 12 carbon atoms. Exemplary vinyl aromatic polymers are those prepared from monomers having from 8 to about 20 carbon atoms. Examples of such monomers may be referred to the monomers for the polymer nanoparticle formation as described supra. In certain exemplary embodiments, the conjugated diene monomer and vinyl aromatic monomer are normally used at the weight ratios of about 1:99 to about 99:1, or about 15:85 to about 85:15. The rubbery matrix can have 1,2-microstructure contents ranging from about 1 percent to about 99 percent, or polymers, copolymers or terpolymers having 1,2-microstructure content of from about 1 to 99 percent, based upon the diene content of the rubbery matrix. The copolymers are preferably random copolymers which result from simultaneous copolymerization of the monomers with randomizing agents, as is known in the art.

The rubber matrix may comprise any conventionally employed treadstock rubber such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and the mixture thereof.

The rubber matrix used in tires, hoses, power transmission belts and other industrial products has good compatibility with fillers, such as carbon black and silica. To attain improved interaction with fillers, the rubbery matrix can be functionalized with various compounds, such as amines.

A rubber matrix such as diene polymer may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization and emulsion polymerization. The polymerization may be carried out using free radical mechanism, anionic mechanism, or cationic mechanism. An exemplary method of polymerization is emulsion polymerization with commonly used free radical initiators.

Exemplary free radical initiators include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyc-lohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in aqueous emulsion polymerizations.

Of course, the polymerization may also be carried out with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide.

The amount of initiator employed will vary with the desired molecular weight of the rubbery matrix polymer being synthesized. Higher molecular weights are achieved by utilizing smaller quantities of the initiator and lower molecular weights are attained by employing larger quantities of the initiator. The molecular weight of the rubbery polymer produced is, of course, also dependent upon the amount of chain transfer agent, such as t-dodecyl mercaptan, present during the polymerization. For instance, low molecular weight rubbery polymers can be synthesized by simply increasing the level of chain transfer agent.

In batch operations, the polymerization time of diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

Optionally, other vinyl comonomers that can potentially be polymerized into the rubbery matrix of the composition may be used. Such comonomers include, but are not limited to, alkyl (meth)acrylates, such as methyl acrylate, ethyl acrylate, butyl acrylate, methyl methacrylate and the like; α-olefins such as ethylene, propylene, 1-butene and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide; vinylpyridine, methacrylic acid, itaconic acid, acrylic acid, and the like, and the mixture thereof.

For anionic polymerization, quenching of the reaction with a functional terminating agent provides a way of functionalization for the rubbery matrix. Any compounds providing terminal functionality (i.e., endcapping) that are reactive with the polymer bound carbon-lithium moiety can be selected to provide a desired functional group. Exemplary compounds include ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and the like, and the mixtures thereof. Further examples of reactive compounds include the terminators described in U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from 0 to 3, and "b" is an integer from 1 to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is preferred, it is further preferred to terminate by a coupling reaction with, for example, tin tetrachloride or other coupling agent such as silicon tetrachloride or esters. High levels of tin coupling are desirable in order to maintain good processability in the subsequent manufacturing of rubber products.

The present invention further provides a composition comprising (a) a liquid polymer, (b) polymer nanoparticles, (c) a rubber matrix, (d) an optional oil, and (e) one or more components selected from the group consisting of carbon black, silica, vulcanizing agent, vulcanization accelerator, tackifier resin, antioxidant, fatty acids, zinc oxide, wax, peptizer, vulcanization retarder, activator, processing additive, plasticizer, pigments, and antiozonant. Various rubber products such as tire and power belt may be manufactures based on this composition.

The terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

Oil has been conventionally used as a compounding aid in the composition. Examples of oil include, but are not limited to, aromatic, naphthenic, and/or paraffinic processing oils. In a variety of exemplary embodiments, the liquid polymer of the invention is used along with the oil, or is used to replace a portion of the oil, or is used to replace entirety of the oil. As such, typical amount of oil may broadly range from about 0 phr to about 100 phr, from about 0 phr to about 70 phr, or from about greater than 0 phr to about 50 phr, based on 100 phr rubbery matrix in the composition of the invention. However, the total amount of the liquid polymer and the oil should be controlled within the range of from about 1 phr to about 200 phr, preferably from about 1 phr to about 100 phr, and more preferably from about 5 phr to about 50 phr, based on 100 phr rubbery matrix of the composition.

As a skilled artisan can appreciate, reinforcement of a rubber product may be reflected by a low strain dynamic modulus G', as can be measured according to ASTM-D 412 at 22° C. In a variety of exemplary embodiments, reinforcement of rubber products such as tires made from the composition of the present invention may be achieved by (i) incorporation of the liquid polymer; (ii) partially replacing the oil with the liquid polymer; (iii) entirely replacing the oil with the liquid polymer; and/or (iv) incorporation of the polymer nanoparticles.

The energy loss of an elastomer is termed hysteresis, which refers to the difference between the energy applied to deform an article made from the elastomer and the energy released as the elastomer returns to its initial and undeformed state. Hysteresis is characterized by a loss tangent, tangent delta (tan δ), which is a ratio of the loss modulus to the storage modulus (i.e., the viscous modulus to the elastic modulus) as measured under an imposed sinusoidal deformation. The tan δ value can be measured, for example, with a TA Instrument ARES Rheometer The present invention provides various rubber products with improved reinforcement and controllable hysteresis. By controllable hysteresis, it is meant that the hysteresis is increased or decreased, or remains roughly unchanged, comparing to the situation where oil is present in the composition, but no liquid polymer and no polymer nanoparticles are included in the composition. For example, G'(MPa) may be increased at least about 0.3, preferably at least about 1.5, and more preferably at least 3.0.

Rubber products with improved reinforcement and suitable hysteresis may be manufactured from the composition of the invention as described above, in which the phr ratio between the component (a) liquid polymer and component (b) polymer nanoparticles is within the range of from about 1:99 to about 99:1, preferably within the range of from about 10:80 to about 80:10.

Carbon black is used as a reinforcing filler and normally provides or enhances good physical properties for sulfur cured rubber. A filler and the rubbery matrix should be compatible enough so that the filler can be incorporated and dispersed into the matrix easily and uniformly while only minimally disturbing the structure of the original matrix polymer. In general terms, the effect of a filler on rubber physical properties can be related mainly to how many polymer chains are attached to the filler surface and how strongly they are attached. Fillers work differently in various polymeric systems. The characteristics which determine the properties a filler imparts to a rubber compound are particle size, surface area, structure, and surface activity. In considering fillers of adequately small particle size, reinforcement potential can be predicted from the fillers' surface area, surface activity, and persistent structure or anisometry. The general influence of each of these three filler characteristics above on rubber properties can be summarized as follows: (1) Increasing surface area (decreasing particle size) gives lower resilience and higher Mooney viscosity, tensile strength, abrasion resistance, tear resistance, and hysteresis. (2) Increasing surface activity (including surface treatment) gives higher abrasion resistance, chemical adsorption or reaction, modulus, and hysteresis. (3) Increasing persistent structure/anisometry gives higher Mooney viscosity, modulus, and hysteresis, lower extrusion shrinkage, tear resistance, and resilience, and longer incorporation time. Moreover, filler-filler interaction should not be so strong as to significantly increase the compound viscosity during mixing or the hardness of the finished product.

The carbon black may be selected from any of the commonly available carbon blacks, but those having a surface area (EMSA) of at least 20 m$^2$/g and, more preferably, at least 35 m$^2$/g up to 200 m$^2$/g or higher are preferred. Surface area values may be determined by ASTM D-1765 using the cetyl-trimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks may also be used. Exemplary carbon blacks include N-110, N-220, N-339, N-330, N-343, N-351, N-550, N-660, and the like, as designated by ASTM D-1765-82a. The carbon blacks utilized may be in pelletized form or an unpelletized flocculent mass. Preferably, for more uniform mixing, unpelletized carbon black is preferred.

A typical amount of carbon black may broadly range from about 5 phr to about 200 phr, preferably from about 10 phr to about 150 phr, and more preferably from about 50 phr to about 100 phr, based on 100 phr rubbery matrix in the composition of the invention.

Silica may also be used as a filler. For example, use of amorphous precipitated silica as a reinforcing filler has resulted in tire treads having low rolling resistance, while at the same time providing high abrasion resistance. Moreover, tire treads containing silica tend to provide better braking performance on wet road surfaces. Without being bound to any particular theory, it is believed that the increased wet traction and skid resistance of silica-filled tire tread compounds is due to the polar (hydrophilic) silanol groups on the surface of the silica particles that improve the affinity between the rubber surface and the wet road surface, thereby increasing the coefficient of adhesive friction. Exemplary silica fillers include, but are not limited to, precipitated amorphous silica, wet silica (hydrated silicic acid), dry silica (anhydrous silicic acid), fumed silica, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. According to the present invention, the surface area should be about 32 m$^2$/g to about 400 m$^2$/g, with the range of about 100 m$^2$/g to about 250 M$^2$/g being preferred, and the range of about 150 m$^2$/g to about 220 m$^2$/g being most preferred. The pH of the silica filler is generally about 5.5 to about 7 or slightly over, preferably about 5.5 to about 6.8.

The silica filler may be selected from any of the commonly available silicas. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

To improve filler dispersion and reduce agglomeration and re-agglomeration of silica aggregates, a coupling agent may be used along with silica fillers. Typically, a silica coupling agent has at least two functional groups, one of which is reactive with the silica surface such as a silyl group, and another one can bind to the rubbery matrix such as mercapto, amino, vinyl, epoxy or sulfur group. Exemplary coupling agents include, but are not limited to, mercaptosilanes and organosilane polysulfides having an average of from 3.5 to 4 sulfur atoms in its polysulfidic bridge. For example, bis-(3-trialkoxysilylorgano)polysulfides such as bis-(3-triethoxysilyl-propyl)tetrasulfide, which is sold commercially as Si69 by Degussa has an average of about 3.8 sulfur atoms in its polysulfidic bridge. It is envisioned that such polysulfide can be a sulfur donor, by liberating free sulfur, during typical high shear mixing of a rubber composition at an elevated temperature such as, for example, at temperatures of 100° C. and above. The small amount of free liberated sulfur may be then available to combine with and/or possibly partially vulcanize, a diene-based matrix.

A silica dispersing aid such as monofunctional silica shielding agent may be used along with silica fillers. Examples of silica dispersing aid include silica hydrophobating agents that chemically react with the surface silanol groups on the silica particles but are not reactive with the matrix elastomer and agents which physically shield the silanol groups, to prevent reagglomeration (flocculation) of the silica particles after compounding. Specific examples of silica dispersing aid include alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, among others. Such silica dispersing aids can be used to replace all or part of expensive bifunctional silica coupling agents, while improving the processability of silica-filled rubber compounds by reducing the compound viscosity, increasing the scorch time, and reducing silica reagglomeration.

Typical amount of silica, if used, may broadly range from about 5 phr to about 200 phr, preferably from about 10 phr to about 150 phr, and more preferably from about 50 phr to about 100 phr, based on 100 phr rubbery matrix in the composition of the invention.

A combination of silica and carbon black is utilized for reinforcing fillers for various rubber products, including treads for tires.

Other fillers can be utilized according to the present invention as processing aids which include, but are not limited to, mineral fillers, such as aluminum silicate, calcium silicate, magnesium silicate, clay (hydrous aluminum silicate), talc (hydrous magnesium silicate), and mica as well as non-mineral fillers such as urea and sodium sulfate. Preferred micas contain principally alumina, silica and potash, although other variants are also useful.

A vulcanizing agent can be used to cure the composition of the invention that comprises a rubbery matrix and polymer nanoparticles. For a general disclosure of suitable vulcanizing agents, one can refer to Kirk-Othmer, *Encycolopedia of Chemical Technology*, $3^{rd}$ ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In preferred embodiments, sulfur or peroxide-based vulcanizing agent may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. Preferably, the sulfur vulcanizing agent is soluble sulfur or a mixture of soluble and insoluble polymeric sulfur.

Typical amount of vulcanizing agent such as sulfur may broadly range from about 0.1 phr to about 10 phr, preferably from about 0.5 phr to about 5 phr, and more preferably from about 1 phr to about 4 phr, based on 100 phr rubbery matrix in the composition of the invention.

A vulcanization accelerator may be used along with a vulcanizing agent is used to control the time and/or temperature required for vulcanization and to improve properties of the vulcanizate. The vulcanization accelerators used in the present invention are not particularly limited. Examples of vulcanization accelerator include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; guanidine vulcanization accelerators, such as diphenylguanidine (DPG) and the like; amines; disulfides; thiurams; sulfenamides; dithiocarbamates; xanthates; and thioureas; among others.

The composition of the present invention may be compounded by methods generally known in the rubber compounding art, such as mixing the rubbery matrix polymer and the nanoparticles with conventional amounts of various commonly used additive materials, using standard rubber mixing equipment and procedures.

A vulcanized rubber product may be produced from the composition of the present invention by thermomechanically mixing a liquid polymer, a rubbery matrix polymer, nanoparticles, and various ingredients in a sequentially step-wise manner in a rubber mixer, followed by shaping and curing the composition. By thermomechanical mixing, it is meant that various ingredients in the composition is mixed under high shear conditions where the composition autogeneously heats up, with an accompanying temperature rise, as a result of the mixing primarily due to shear and associated friction within the composition in the rubber mixer.

For example, a composition typically exclusive of free sulfur and sulfur vulcanization accelerators is blended in at least one, and usually at least two, sequential, preparatory thermomechanical mixing stage(s) in suitable mixers, usually internal rubber mixers. Such preparatory mixing is often referred to as "non-productive mixing", or "non-productive mixing steps or stages". Such preparatory mixing may be conducted, for example, at temperatures in a range of about 70° C. to 200° C. and more often in a range of about 90° C. to about 150° C. Subsequent to such preparatory mix stage(s), a vulcanizing agent such as free sulfur and vulcanization accelerators, and optionally one or more additional ingredients, are mixed into the composition, in a final productive mix stage, typically at a temperature within a range of about 70° C. to about 150° C., which is a lower temperature than the temperatures utilized in the aforesaid preparatory mix stage(s) in order to prevent or retard premature curing or unwanted precure of the sulfur-curable rubber, which is sometimes referred to as "scorching", of the rubber composition. Such sequential, non-productive mixing steps and the subsequent productive mixing step are well known to those in the rubber mixing art.

One or more remill steps may be employed during the above process for the purposes of reducing the compound viscosity, and improving the dispersion of fillers, among others. In remill step(s), either no ingredients are added to the mixture, or non-curing ingredients are added. The temperature of the remill step is typically in a range of about 70° C. to 150° C. and more often in a range of about 70° C. to about 120° C.

The rate of cure of the composition can be controlled and optimized. The "rate of cure" is defined as the rate at which crosslinking and the development of the stiffness (modulus) of a rubber compound occurs. As the rubber compound is heated, the properties of the rubber compound change from a soft plastic to a tough elastic material. During the curing step, crosslinks are introduced, which connect the long polymer chains of the rubber. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of cure time.

Rubber articles such as tires may be manufactured from the composition as described supra. References for this purpose may be made to, for example, U.S. patent application 2004/0143064 A1.

The composition of this invention can be used for various purposes. For example, it can be used for various rubber compounds, such as a tire treadstock, sidewall stock or other tire component stock compounds. Such tires can be built, shaped, molded and cured by various methods which are known and will be readily apparent to those having skill in such art. In an embodiment, a molded unvulcanized tire is charged into a vulcanizing mold and then vulcanized to produce a tire, based on the composition and the procedure as described above.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Example A

The Synthesis of Micelle Nano-Particles

A 2-gallon reactor was used. Butadiene in hexane blend (21.9 weight percent butadiene), styrene in hexane (33 weight percent styrene), hexane, n-butyl lithium (1.54 M), OOPS modifier (1.6 M), isopropanol and BHT were used as supplied. Divinylbenzene was purchased from Aldrich (80% divinylbenzene) and stored on alumina beads and calcium hydride.

The reactor was charged with 4.80 lbs hexane and 3.98 lbs of the butadiene in hexane blend. The jacket of the reactor was heated to 165° F. When the batch reached 153° F., 2.5 mL of 1.54 M n-butyl lithium were added, diluted with about 20 mL of hexane. The polymerization exothermed at 191.7° F. after 14 minutes of reaction. After ½ hour, the jacket of the reactor was set to 100° F. A sample was dropped for analysis. Some n-butyl lithium (7.5 mL) was added. A mixture of styrene blend (349.2 g) and DVB (45.5 mL) was prepared in a bottle and added to the reactor. The jacket temperature of the reactor was increased to 180° F. After 3 hours of reaction, the temperature was brought down and the mixture was dropped in isopropanol containing BHT. The solid was then filtered through cheesecloth and drum-dried.

The low-vinyl PBd shell had a molecular weight of 90,000. The final polymer contained 92% of micelles.

Example B

The Synthesis of a Liquid Polymer

A 2-gallon reactor was used. Butadiene in hexane blend (21.4 weight percent butadiene), hexane, n-butyl lithium (1.60 M), OOPS modifier (1.6 M), isopropanol and BHT were used as supplied.

The reactor was charged with 2.99 lbs hexane and 7.00 lbs butadiene in hexane blend. The jacket of the reactor was heated to 140° F. When the batch reached 113° F., 5.3 mL of 1.60 M n-butyl lithium were added, diluted with about 20 mL of hexane. The polymerization exothermed at 177.9° F. after 33 minutes of reaction. After 1 hour, the temperature was brought down and the mixture was dropped in isopropanol containing BHT. The solvents were then removed through evaporation and drying in a vacuum oven.

Measurement using GPC indicated that the liquid polymer had an average molecular weight of 80K, (80 kg/mol)

Examples 1-4

Compounding

A matrix polybutadiene obtained from Firestone Polymer Company under Trade name HX301 was used. The matrix polybutadiene had a molecular weight of about 150,000, a 12% vinyl butadiene and a 40 Mooney viscosity. Rubber compositions were prepared according to Table 4 under the conditions shown in Tables 1-3. In the formulations, the amounts of matrix rubber, aromatic oil, micelle nano-particles, and liquid polymer were varied. The synthesized nano-particle from Example A was selectively used to replace 15 phr of the matrix polubutadiene in the compound formulation (Example 2). The synthesized nano-particle from Example A was selectively used to replace 15 phr of the matrix polubutadiene and the liquid polymer from Example B was sused to replace the aromatic oil (Example 4). Two controls (i.e., Example 1 and 3) were used for setting up a comparison with the test compounds. One was the conventional formulation (Example 1); and the other (Example 3) was the formulation where the aromatic oil has been replaced by the liquid polymer from Example B. In each sample, a blend of the ingredients was kneaded by a method listed in Table 3. The final stock was sheeted and molded at 165° C. for 15 minutes.

On the vulcanized rubber compounds of Examples 1 to 4, measurement of the tensile strength, tear strength, hysterisis loss gave the results as shown in Table 4 and FIG. 1. Measurement of tensile strength was based on conditions of ASTM-D 412 at 22° C. Test specimen geometry was taken the form of a ring of a width of 0.05 inches and of a thickness of 0.075 inches. The specimen was tested at a specific gauge length of 1.0 inches. The hysteresis loss was measured with a TA Instrument ARES Rheometer. Test specimen geometry was taken the form of a cylinder of a length of 15 mm and of a diameter of 9 mm. The following testing conditions were employed: frequency 5 Hz, 1% strain.

TABLE 1

Composition for Mater Batch

| | |
|---|---|
| Polybutadiene | 100.00 |
| Carbon Black (N343) | 50.00 |
| Aromatic Oil | 15.00 |
| Zinc Oxide | 3.00 |
| Hydrocarbon Resin (tackifiers) | 2.00 |
| Santoflex 13 (antioxidants) | 0.95 |
| Stearic Acid | 2.00 |
| Wax | 1.00 |

TABLE 2

Composition for Final Batch

| | |
|---|---|
| Sulfur | ~1.30 |
| Cyclohexyl-benzothiazole sulfonamide (CBS) accelerator | 1.40 |
| Diphenylguanidine (DPG) accelerator | 0.20 |

TABLE 3

Mixing Conditions

| Mixer: 300 g Brabender Mater Batch Stage | Agitation Speed: 60 rpm |
|---|---|
| Initial Temperature | 110° C. |
| 0 min | charging polymers |
| 0.5 min | charging oil and Carbon Black |
| 5.0 min | drop |
| Mater Remill Stage | |
| Initial Temperature | 110° C. |
| 0 min | charging polymers |
| 5.0 min | drop |
| Final Batch Stage | |
| Initial Temperature | 75° C. |
| 0 sec | charging master stock |
| 30 sec | charging curing agent and accelerators |
| 75 sec | drop |

TABLE 4

| | Ex. 1 | Ex. 2 | Ex. 3 | Ex. 4 |
|---|---|---|---|---|
| Matrix Polybutadiene (phr) | 100 | 85 | 100 | 85 |
| Aromatic Oil (phr) | 15 | 15 | — | — |
| Ex. A Micelle Nano-Particles (phr) | 0 | 15 | — | 15 |
| Ex. B Liquid Polybutadiene (phr) | 0 | — | 15 | 15 |
| t50%, 171° C. Cure Rheometer (min) | 2.79 | 2.83 | 2.56 | 2.82 |
| t90%, 171° C. Cure Rheometer (min) | 3.84 | 3.79 | 3.53 | 3.86 |
| MH-ML, 171° C. Cure Rheometer (kg-cm) | 15.1 | 15.3 | 18.0 | 18.6 |
| $ML_{1+4}$ @ 130° C. | 39.2 | 48.3 | 46.5 | 55.1 |
| ts5 Mooney Scorch @ 130° C. (min.) | 22.2 | 21.6 | 17.0 | 19.0 |
| 50% Modulus @ 23° C. (MPa) | 1.03 | 1.18 | 1.30 | 1.43 |
| 300% Modulus @ 23° C. (MPa) | 6.45 | 7.20 | 8.03 | 8.65 |
| Tensile Break Stress, Tb @ 23° C. (MPa) | 15.2 | 16.7 | 17.0 | 17.5 |
| Elongation at Break, Eb @ 23° C. (%) | 517 | 519 | 477 | 467 |
| Tb · Eb @ 23° C. (MPa · %) | 7841 | 8667 | 8109 | 8173 |
| 50% Modulus @ 100° C. (MPa) | 0.77 | 0.88 | 0.99 | 1.13 |
| 200% Modulus @ 100° C. (MPa) | 2.85 | 3.28 | 3.84 | 4.09 |
| Tensile Break Stress, Tb @ 100° C. (MPa) | 6.70 | 7.30 | 8.38 | 8.48 |
| Elongation at Break, Eb @ 100° C. (%) | 344 | 332 | 328 | 320 |
| Tb · Eb @ 100° C. (MPa · %) | 2305 | 2424 | 2749 | 2714 |
| tan δ (torsion button; 0° C.; 0.5 Hz, 2%) | 0.199 | 0.204 | 0.187 | 0.184 |
| G' [torsion button; 0° C.; 0.5 Hz, 2%] (MPa) | 4.07 | 5.14 | 4.03 | 4.85 |
| tan δ (torsion button; 50° C.; 5 Hz, 2%) | 0.182 | 0.192 | 0.173 | 0.175 |
| G' [torsion button; 50° C.; 5 Hz, 2%] (MPa) | 2.78 | 3.38 | 3.14 | 3.58 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A composition made by a method comprising:
   in a liquid hydrocarbon medium, polymerizing conjugated diene monomers to produce a poly(conjugated diene) block;
   in a liquid hydrocarbon medium, copolymerizing the poly(conjugated diene) block with a mixture of mono-vinyl aromatic monomer and multiple-vinyl aromatic monomer to form cross-linked core-shell nanoparticles;
   combining the nanoparticles with a liquid polymer and a rubber matrix to form a composition;
   wherein the liquid polymer has a lower viscosity than the rubber matrix.

2. The composition of claim 1, wherein the cross-linked nanoparticles comprise copolymer chains comprising a poly(conjugated diene) block and a mono-vinyl aromatic block, wherein the mono-vinyl aromatic block is crosslinked by the multiple-vinyl aromatic monomer to form a core region.

3. The composition of claim 2, wherein the copolymer chains assemble to form micelle structures prior to crosslinking.

4. The composition of claim 1, wherein the liquid polymer has an Mw of about 80,000.

5. The composition of claim 1, wherein the liquid polymer comprises isoprene-butadiene rubber with an essentially random microstructure.

6. The composition of claim 1, wherein the nanoparticles are crosslinked throughout the entire region of the core.

7. The composition of claim 1, comprising controlling hysteresis of the composition while improving tan delta by adding the liquid polymer and the nanoparticles to the composition and eliminating processing oil from the composition, wherein hysteresis and tan delta are measured after vulcanizing the composition.

8. The composition of claim 1 wherein the rubber matrix, a shell of the core-shell nanoparticles, and the liquid polymer having viscosity lower than a viscosity of said rubber matrix each comprise the same monomer type.

9. The composition of claim 1, wherein the liquid polymer having viscosity lower than a viscosity of said rubber matrix comprises isoprene-butadiene rubber with an essentially random microstructure.

10. The composition of claim 1, wherein the rubber matrix comprises polybutadiene and the liquid polymer having viscosity lower than the viscosity of said rubber matrix comprises polybutadiene.

11. The composition of claim 1, wherein the nanoparticles are not made by emulsion polymerization.

12. The composition of claim 1, wherein the number-average molecular weight of the liquid polymer is in the range of from about 25,000 to about 120,000.

* * * * *